(12) United States Patent
Tegge et al.

(10) Patent No.: US 6,252,406 B1
(45) Date of Patent: Jun. 26, 2001

(54) PROGRAMMABLE EVENT LIMIT DETECTOR FOR COMPUTER SYSTEM POWER CONTROL

(75) Inventors: Rainer Tegge, Warren; John Chapman, Mahwah, both of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/481,970

(22) Filed: Jan. 12, 2000

(51) Int. Cl.[7] .............................................. G01N 27/416
(52) U.S. Cl. ............................................ 324/427; 320/136
(58) Field of Search ..................................... 324/427, 428, 324/426; 320/136, 135

(56) References Cited

U.S. PATENT DOCUMENTS

| | | | |
|---|---|---|---|
| 5,032,825 | * | 7/1991 | Kuznicki ............................ 320/136 |
| 5,633,537 | * | 5/1997 | Kurata et al. ....................... 307/10.6 |
| 5,973,497 | * | 10/1999 | Bergk et al. ........................ 324/428 |

* cited by examiner

Primary Examiner—Peter S. Wong
Assistant Examiner—Lawrence Luk
(74) Attorney, Agent, or Firm—Loria B. Yeadon

(57) ABSTRACT

A system for controlling the application of power from a battery (12) to an electrical system (18) as well as to a computer (30) that monitors the battery, includes a switch (52) in the power supply path between the battery and the computer. The switch is operated by a controller (40) that receives data representing the battery voltage and the current supplied to the electrical system (18). The controller includes a comparator for comparing the received voltage and current data to preset data values to produce a signal (46) to turn on the switch for a predetermined time to supply power to actuate the computer to perform its monitoring function when one of the current or voltage data received by the controller exceeds one of a predetermined high or low limit data value. The system also includes a wake-up circuit (48) to produce the signal to turn on the switch for a predetermined time to supply power to actuate the computer when one of the predetermined high or low voltage or current limits is not exceeded for a given time.

6 Claims, 2 Drawing Sheets

PROGRAMMABLE EVENT LIMIT DETECTOR FOR COMPUTER SYSTEM POWER CONTROL

FIELD OF THE INVENTION

The present invention relates to a controller circuit to automatically shut down and reactivate a computer that monitors a battery that powers an electrical system, as well as the computer, in order to conserve battery power.

BACKGROUND OF THE INVENTION

Systems using a computer are known to monitor the state of a battery supplying power to an electrical system, such as described in U.S. Pat. No. 4,937,528, Method For Monitoring Aircraft Battery Status" and U.S. Pat. No. 5,281,919, "Automotive Battery Status Monitor", which are owned by the assignee of the subject application. In those patents, the battery being monitored supplies power to the electrical system of various types of vehicles, as well as to the computer that performs the monitoring. The computer receives input data such as the battery voltage and current being drawn by the electrical system and monitors, analyzes and computes battery status factors, such as battery internal resistance, polarization resistance, state of charge and remaining capacity.

It is sometimes desired to prevent excessive power drain of the battery. One way to accomplish this would be to power on the computer only periodically to perform its necessary computations and analysis. At other times, the computer would be deactivated and not supplied with electrical power.

BRIEF DESCRIPTION OF THE INVENTION

The present invention is directed to a system that controls the power supplied to a computer monitoring a battery which supplies power to an electrical system and also supplies power to the computer.

It is an object of the present invention to provide a controller to automatically deactivate and reactivate a computer system which monitors a battery that powers an electrical system and also provides power to the computer.

Another object is to provide a controller system that periodically activates a computer monitoring a battery upon one of the voltage or current drawn from the battery exceeding a predetermined high or low limit.

A further object is to provide a controller that periodically powers on a computer that monitors a battery to perform its computation function during times when the battery voltage or current drawn by an electrical system powered by the battery is not exceeding a predetermined limit.

A further object is to provide a controller to automatically deactivate and reactivate a computer system monitoring a battery that powers the computer and also powers an electrical system at times when the battery is not normally supplying power to the electrical system.

In an illustrative embodiment, the controller operates to power on the computer for a period of time sufficient to allow the computer to perform its computations and analysis based on events, such as elapsed time, the battery voltage and the battery current drawn by the electrical system being supplied by the battery. In accordance with one aspect of the invention, the computer is activated from a sleep mode during which it is not being supplied with power in order to perform its computation function in response to one of the battery voltage and/or current drawn exceeding a high or low limit. After the computer performs its computation function, the power is turned off and the computer is returned to the sleep mode. If the electrical system powered by the battery is operating in a normal state, such as when the vehicle is running, the battery is being charged, or the battery is being discharged at a rate greater than 0.5 Amp, the computer continuously monitors the battery. In another aspect of the invention, if the electrical system is normally inactive, such as when the vehicle is parked, and one of the voltage and current limits have not been exceeded, the computer is periodically powered on by the controller to perform its computational function.

BRIEF DESCRIPTION OF THE DRAWINGS

The foregoing and other objects and advantages of the present invention will become more apparent upon reference to the following specification and annexed drawings in which.

DETAILED DESCRIPTION OF THE INVENTION

Figure 1:
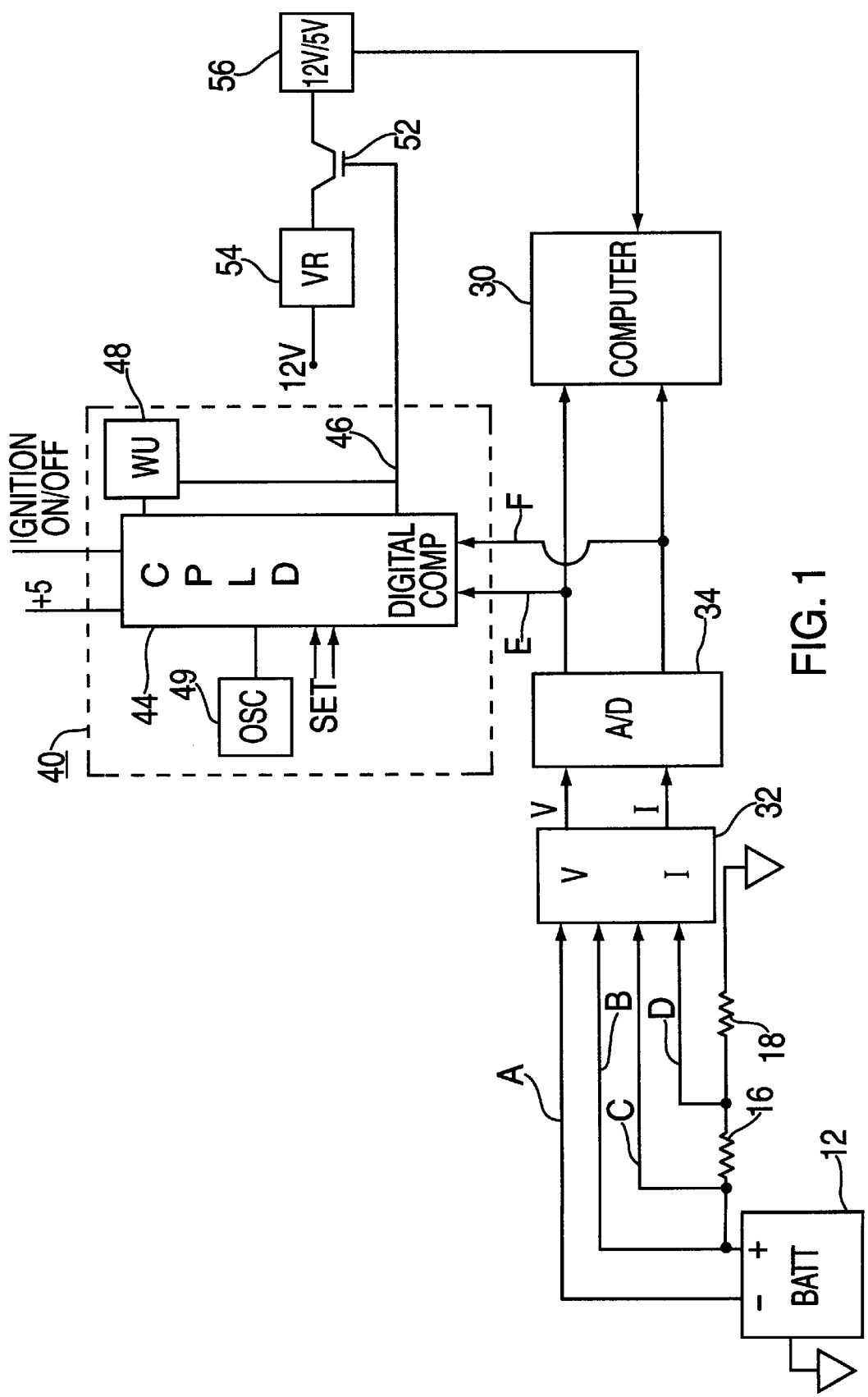
FIG. 1 is a schematic block diagram of the system of the invention.

In FIG. 1 a conventional battery 12 is being monitored. The invention is illustratively described with the battery located in a vehicle of any suitable type, such as an auto, truck, bus, aircraft, etc. The battery supplies power to a load or electrical system of the vehicle. Conditions related to battery 12, such as its internal resistance, polarization resistance, state of charge, capacity, and condition of the battery terminals, are to be monitored by a computer 30. The monitoring circuit for the battery, and the conditions monitored, can be of any suitable type such as described in the aforesaid patents. While the invention is described in relation to a vehicle battery, it is applicable to any situation in which the computer monitors a battery that powers the computer as well as another system.

The main data needed to monitor the battery are its open circuit and operating voltage, and the current that is drawn from or charged into the battery. Other factors, such as temperature, can be measured. The calculations for the desired results are made by the computer 30 from the acquired data. This is explained in the aforesaid patents. In FIG. 1, leads A and B are connected to the positive and negative terminals of battery 12 in order to measure its voltage. Leads C and D are connected to a current measuring device, such as a shunt 16, in series with one of the battery cables. Resistor 18 represents the vehicle electrical load, that is, the current drawn by vehicle operating systems such as lighting, ignition, and air conditioning, as well as by the computer 30 itself. The current drawn from the battery by the electrical system and computer is measured across shunt 16.

The outputs of leads A and B from the battery, and C and D from shunt 16, are applied to a sensor unit 32 which contains, for example, a voltmeter to measure the battery voltage (leads A and B) and the voltage across the shunt (leads C and D) which corresponds to the current. Unit 32 can contain signal conditioning circuits to keep noise and other unwanted effects from affecting its output. Unit 32 produces voltage V and current I measurement data in analog form, that is, two different voltages, and this is applied to an analog/digital converter 34 which converts the data to the digital form necessary for use by the computer 30.

In accordance with the invention, a control circuit 40 is provided to control the activation and de-activation of the computer 30. For example, if the vehicle is parked for an extended period, meaning that its electrical system should be shut down, the computer 30 is turned on periodically for the time needed to measure battery conditions. The rest of the time the computer can be de-activated, or placed in a "sleep" mode, so that it does not unnecessarily use the battery power and reduce its capacity. However, even with the vehicle parked and the electrical system supposedly off, there can be occurrences that cause current drain or change in battery voltage. To take care of these possibilities, the controller operates to activate the computer, i.e., turn it on or wake it up from the sleep mode, upon the occurrence of certain conditions. These can be, for example, upon either or both of the voltage and current exceeding predetermined high and low limits when the computer is in the sleep mode. For example, when the vehicle is parked it might be useful to actuate the computer when the battery voltage drops below a preset limit in order to provide an indication of battery deterioration or possible failure. The controller 40 also operates to periodically power on the computer to perform its functions when the vehicle is operating normally and to de-activate it at other times in order to conserve battery power.

As shown in FIG. 1, the controller 40 controls application and removal of operating voltage (power) for computer 30 by operating a switch, shown as an FET 52. The input to the FET is the voltage from battery 12, which can be 12V, applied through a conventional voltage regulator 54 to the source (or drain) of the FET. The output of the voltage from the drain (or source) of the FET is applied to a conventional voltage conditioning device 56 which produces the voltage necessary to operate the computer 30, for example +12V and +5V. When FET switch 52 is "on" (conductive) computer 30 is supplied with operating voltage. When the FET is "off" (non-conductive) computer 30 is de-activated to the sleep mode.

Controller circuit 40 includes a central programmable logic device (CPLD) 44 which is a dedicated pre-programmed or programmable controller of the digital type, as is well-known in the art. Such controllers have the capability of performing computational and comparison functions in response to digital data. Control circuit 40 and the CPLD 44 are active at all times. The CPLD is shown as receiving a 5V supply which can be voltage stepped down from the normal 12V supply from battery 12. The current drawn by the controller 40 is small relative to that drawn by the computer 30 when operating.

The CPLD 44 also receives an input which indicates whether the vehicle is operating or not. This can be from the vehicle ignition circuit. When the ignition is "on" the vehicle is in an operative mode, such as engine being started or actually running. When the ignition is "off" the vehicle would typically be parked and most or all of its electrical systems should be shut down.

Lines E and F apply the digital data representing the measured voltage and current data from analog/digital converter 34, to an input of the CPLD. This is the battery voltage and current data as measured by the sensor unit 32 that also is supplied to the computer. The voltage and current measuring sensors 32 are always on. If desired, the input leads E an F to controller circuit 40 can be connected directly from the battery and circuit 40 can include its own circuits for measuring voltage and current.

One of the functions of the CPLD 44 is to serve as a programmable digital comparator. This is shown as part of the CPLD. The voltage and current digital data supplied by leads E and F is compared with digital values set in the CPLD corresponding to high and low limits for each of the battery voltage and the current that is drawn. If desired, the CPLD can be provided with SET inputs to change these limits. Most typically, the limits would be permanently set in the CPLD. When the comparator portion of the CPLD determines that one of the limits has been exceeded, it awakens (powers on) the computer by producing an output trigger signal on line 46 that is connected to the gate of the FET 52 to turn it on and apply power to the computer 30. As explained with respect to FIG. 2, after it has been determined that a limit has been exceeded, the CPLD goes though a delayed procedure in triggering turn on of the computer in order to avoid turning on the computer in reaction to spurious events, such as noise. This can be accomplished, for example, by not producing the signal to turn on the FET until the condition where the limit is exceeded has existed in the CPLD comparator for a predetermined time.

The CPLD is programmed to maintain the trigger signal produced on line 46 to turn on the FET and the computer for a predetermined period of time, for example, two seconds. This is typically sufficient time for the computer 30 to perform its programmed computations and produce necessary warnings, if this is part of its function.

The trigger signal to turn on the FET when a high or low voltage or current limit has been exceeded preferably is produced only when the vehicle is in an inactive state, i.e., the ignition is "off".

When the vehicle is active or operational, i.e., ignition is "on" as indicated to the CPLD, the CPLD is programmed to continuously turn on the FET 52 to activate the computer 30 on a periodic, or cyclical, basis for the time required, e.g., two seconds, to perform its computational functions. That is, the computer is turned on for the time period needed to perform its computations and then deactivated and placed in a sleep mode. This cycle is repeated, for example, every fifteen seconds or other suitable time as may be required. Any suitable cycle rate can be used. The computer is placed in the de-active mode between each actuated period to conserve battery power.

If desired, the CPLD can be programmed to activate the computer in response to the high and low voltage and current limits during the time periods between the normal activation period, when the vehicle is operational.

Also included as part of the controller 40 is a "wake up" function used when the vehicle is inactive (ignition "off"). This is shown in FIG. 1 by the wake up trigger 48, which is shown as a separate component but is preferably a function of the CPLD. This operates to periodically activate the computer to perform its computational function for the necessary time in the absence of one of the high and low voltage or current limits being exceeded. For example, it may be desired to produce a record or automatically periodically provide information concerning battery status over a period of time during which the vehicle has been parked. A free running oscillator 49 is shown as providing clock signals to the CPLD to count time for the wake up function, but it is preferred that an internal clock of the CPLD be used. The wake up function can be programmed to be initiated at any desired rate, for example once every hour or half hour. That is, at each wake up time the CPLD produces the trigger signal required to turn on switch 52 and the computer 30 is powered on for the time required to perform its calculations.

The computer is then deactivated until the time of the next wake up signal.

Figure 2:
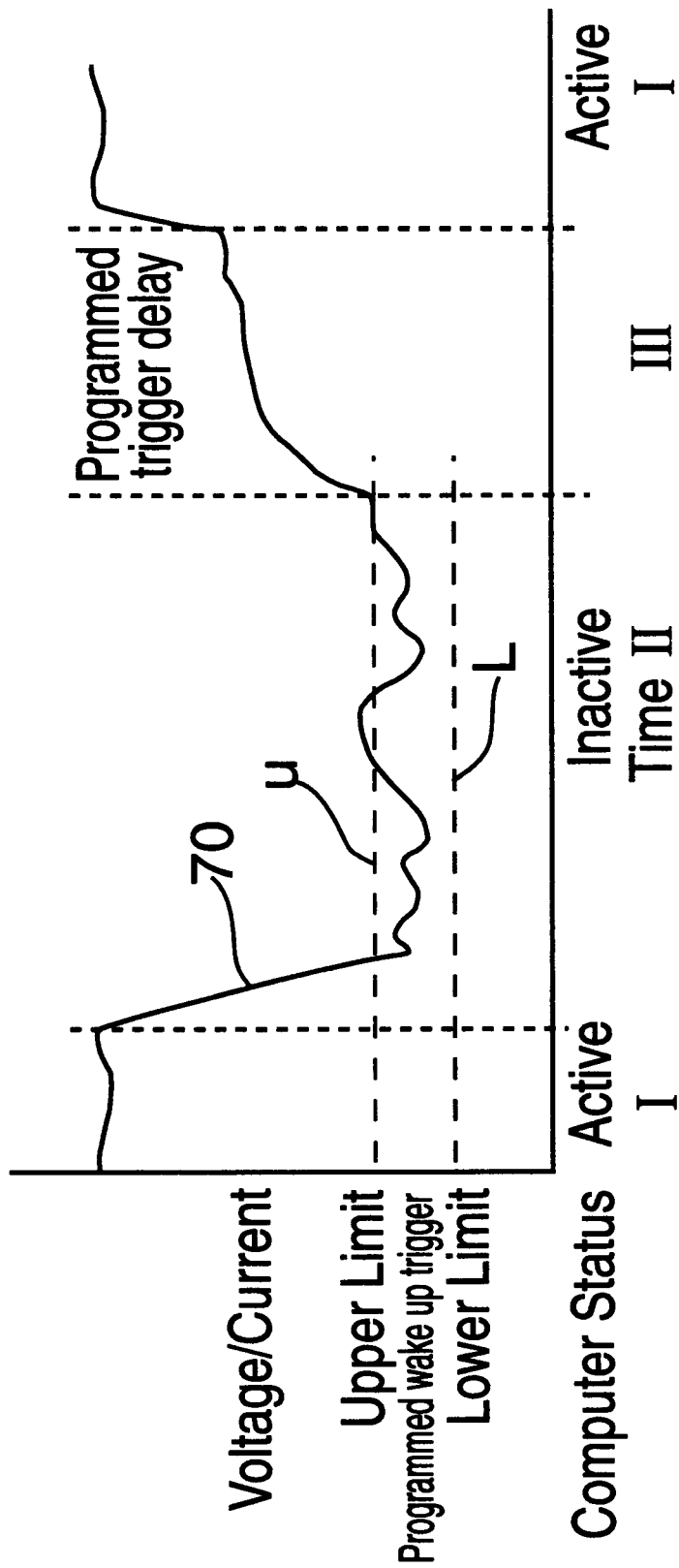
FIG. 2 is a graph showing the current and voltage waveform of the system as the battery is being monitored and the computer is activated and de-activated.

FIG. 2 illustrates the voltage and current conditions produced by the computer 30. Line 70 represents each of the battery voltage and current drawn by the computer. The horizontal axis depicts computer active-inactive status over time and is sectioned into I the computer being Active and 11 it being Inactive or in the sleep mode (not making any computations). Horizontal lines U and L represent upper and lower limits of voltage and current which, if exceeded when the computer is in the sleep mode 11, will cause the controller to supply power to the computer to activate it to make computations. Section III is the time during which the computer operating state is being changed from inactive to active. This can represent a delay during which the CPLD determines if the exceeding limit condition still prevails and to negate spurious effects, such as noise. Once the computer is powered on it performs its computational function and then reverts to the sleep mode. The CPLD can reset the sleep timer. The controller also waits for the next triggering event, i.e. exceeding one of the voltage or current limits, which can activate the computer.

As seen, the voltage and current drawn during the computer active time, section I, is substantially greater than that during the time, section II, that the computer is inactive. This illustrates that the controller 40 is effective in saving power drawn by the computer from the battery that it is monitoring. After the computer is powered up from the sleep mode II it resumes the drain of power needed by it to make the computations and perform other functions.

While the invention has been particularly shown and described with reference to preferred embodiments thereof, it will be understood by those skilled in the art that various changes in form and details may be made therein without departing from the spirit and scope of the invention.

We claim:

1. A system for controlling the application of power from a battery that supplies power to an electrical system and also to a computer that monitors the battery, comprising:
    a switch in the power supply path between the battery and the computer; and
    a controller distinct from the computer and that receives data related to the battery voltage and current supplied to the electrical system; said controller including a comparator for comparing the voltage and current data received to produce a signal to turn on said switch for a predetermined time to supply power to actuate said computer for a time sufficient to perform its battery monitoring function when one of the current or voltage data received by said controller exceeds one of a predetermined high or low limit.

2. A system as in claim 1 wherein said controller further comprises a wake-up circuit to produce the signal to turn on said switch for a predetermined time to supply power to actuate the computer upon none of said predetermined high or low voltage or current limits being exceeded for a given time.

3. A system as in claim 2 wherein the battery is in a vehicle and said wake up circuit operates when said vehicle is inactive.

4. A system as in claim 3 wherein said wake-up circuit operates periodically.

5. A system as in claim 3 wherein, when said vehicle is in an operational state, said controller operates to periodically produce said signal.

6. A system as in claim 1 wherein said controller operates to periodically produce said signal at times in addition to the time said signal is produced upon one of said limits being exceeded.

* * * * *